United States Patent
Fischer et al.

(10) Patent No.: US 7,954,044 B2
(45) Date of Patent: *May 31, 2011

(54) METHOD AND APPARATUS FOR LINKING REPRESENTATION AND REALIZATION DATA

(75) Inventors: Uwe Fischer, Schoenaich (DE); Stefan Hoffmann, Weil im Schoenbuch (DE); Werner Kriechbaum, Ammerbuch-Breitenholz (DE); Gerhard Stenzel, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 401 days.

This patent is subject to a terminal disclaimer.

(21) Appl. No.: 12/126,507

(22) Filed: May 23, 2008

(65) Prior Publication Data
US 2008/0228490 A1 Sep. 18, 2008

Related U.S. Application Data (63) Continuation of application No. 09/447,871, filed on Nov. 23, 1999, now Pat. No. 7,412,643.

(51) Int. Cl.
 G06F 17/30 (2006.01)
 G06F 3/00 (2006.01)
 G01L 15/00 (2006.01)
(52) U.S. Cl. ........ 715/201; 715/205; 715/234; 715/249; 715/730; 704/246; 704/251; 707/602; 707/912

(58) Field of Classification Search .......... 715/200–210, 715/226, 234, 255, 256, 273, 727, 728, 730–732, 715/760, 762, 763, 825, 227, 231, 238, 239, 715/243, 246, 247, 249, 251, 253, 254, 265, 715/274, 275, 700, 719, 723, 746; 704/2, 704/4, 5, 9, 208, 211, 246, 251, 269, 277, 704/278; 707/602, 705, 706, 708, 760, 763, 707/769, 778, 787, 791, 805, 913, 914, 915, 707/916, 917, 918
See application file for complete search history.

(56) References Cited

U.S. PATENT DOCUMENTS
5,274,758 A * 12/1993 Beitel et al. ................... 715/203
(Continued)

FOREIGN PATENT DOCUMENTS
JP 2000-138664 5/2000
(Continued)

OTHER PUBLICATIONS

S. Srinivasan et al., "What is in that video anyway?": In Search of Better Browsing, 6th IEEE Int. Conference on Multimedia Computing and Systems, Jun. 7-11, 1999, pp. 1-6, Florence, Italy.
(Continued)

*Primary Examiner* — Maikhanh Nguyen
(74) *Attorney, Agent, or Firm* — Scully, Scott, Murphy & Presser, P.C.; William Stock, Esq.

(57) ABSTRACT

A method and apparatus for creating links between a representation, (e.g. text data,) and a realization, (e.g. corresponding audio data,) is provided. According to the invention the realization is structured by combining a time-stamped version of the representation generated from the realization with structural information from the representation. Thereby so called hyper links between representation and realization are created. These hyper links are used for performing search operations in realization data equivalent to those which are possible in representation data, enabling an improved access to the realization (e.g. via audio databases).

15 Claims, 7 Drawing Sheets

U.S. PATENT DOCUMENTS

| | | | |
|---|---|---|---|
| 5,515,490 A * | 5/1996 | Buchanan et al. | 715/209 |
| 5,613,032 A * | 3/1997 | Cruz et al. | 386/69 |
| 5,649,060 A | 7/1997 | Ellozy et al. | |
| 5,737,725 A | 4/1998 | Case | |
| 5,857,099 A | 1/1999 | Mitchell et al. | |
| 5,929,849 A | 7/1999 | Kikinis | |
| 5,953,073 A * | 9/1999 | Kozina et al. | 348/558 |
| 5,963,215 A | 10/1999 | Rosenzweig | |
| 6,076,059 A | 6/2000 | Glickman et al. | |
| 6,098,082 A | 8/2000 | Gibbon et al. | |
| 6,172,675 B1 | 1/2001 | Ahmad et al. | |
| 6,243,676 B1 | 6/2001 | Witteman | |
| 6,249,765 B1 | 6/2001 | Adler et al. | |
| 6,260,011 B1 | 7/2001 | Heckerman et al. | |
| 6,263,507 B1 | 7/2001 | Ahmad et al. | |
| 6,271,892 B1 | 8/2001 | Gibbon et al. | |
| 6,282,511 B1 | 8/2001 | Mayer | |
| 6,336,093 B2 | 1/2002 | Fasciano | |
| 6,357,042 B2 | 3/2002 | Srinivasan et al. | |
| 6,404,978 B1 | 6/2002 | Abe | |
| 6,434,520 B1 | 8/2002 | Kanevsky et al. | |
| 6,462,754 B1 | 10/2002 | Chakraborty et al. | |
| 6,473,778 B1 | 10/2002 | Gibbon | |
| 6,603,921 B1 | 8/2003 | Kanevsky et al. | |
| 6,636,238 B1 | 10/2003 | Amir et al. | |
| 6,728,753 B1 | 4/2004 | Parasnis et al. | |
| 6,791,571 B1 | 9/2004 | Lamb | |
| 2001/0023436 A1 | 9/2001 | Srinivasan et al. | |
| 2002/0059604 A1 | 5/2002 | Papagan et al. | |

FOREIGN PATENT DOCUMENTS

| | | |
|---|---|---|
| JP | 2001-111543 | 4/2001 |
| JP | 2001-313633 | 11/2001 |

OTHER PUBLICATIONS

D. Ponceleon et al., "Key to Effective Video Retrieval: Effective Cataloging and Browsing," Proceedings of the 6th ACM International Conference on Multimedia, 1998, pp. 99-107.

Favela et al., "Image-retrieval agent: integrating image content and text", CICESE Research Center, IEEE, Oct. 1999, pp. 36-39.

Amir et al., "CueVideo: Automated video/audio indexing and browsing", IBM Almaden Research Center, ACM, 1996, p. 326.

Gibbon et al., "Generating Hypermedia Documents from Transcriptions of Television Programs Using Parallel Text Alignment", AT&T Labs Research, Feb. 1998, pp. 26-33.

\* cited by examiner

```
<!DOCTYPE book system "book.dtd" [
<!ENTITY % ISOlatl system "isolatl.ent">
  %ISOlatl;
]>
<book>
<chapter>
<heading>Key Note Speech</heading>
<section>
<p><a>
Its a great honor for me to share this stage with the Lord Mayor and Chief
Executive of Hanover; Mr. Jung; and in a few minutes, Chancellor Kohl.</a><a> I've
been looking forward to this evening for a long time, because I've known for many
years how important CeBIT is to the global information technology industry.</s></p>
```
— 101

FIG. 4

```
...
It's
a
great
honor
...
Chancellor
Kohl.
I've
been
looking
...
technology
industry.
...
```
— 104
— 400

FIG. 6

| | |
|---|---|
| ... | |
| It's | 1 1 2 1 1 1 |
| a | 1 1 2 1 1 2 |
| great | 1 1 2 1 1 3 |
| honor | 1 1 2 1 1 4 |
| ... | |
| Chancellor | 1 1 2 1 1 27 |
| Kohl. | 1 1 2 1 1 28 |
| I've | 1 1 2 2 1 1 |
| been | 1 1 2 2 1 2 |
| looking | 1 1 2 2 1 3 |
| ... | |
| technology | 1 1 2 2 1 24 |
| industry. | 1 1 2 2 1 25 |
| ... | |

| | | |
|---|---|---|
| ... | | |
| It's | 588 | 9209 |
| a | 9209 | 9239 |
| great | 9239 | 10196 |
| honor | 10196 | 11154 |
| ... | | |
| Chancellor | 22987 | 24135 |
| Kohl. | 24135 | 24703 |
| I've | 24703 | 25162 |
| been | 25162 | 25621 |
| booking | 25621 | 26419 |
| ... | | |
| technology | 38652 | 39260 |
| industry. | 39260 | 39839 |
| ... | | |

107

704 { Chancellor Kohl. I've been 701  702  703

FIG. 8

| | | |
|---|---|---|
| ... | | |
| It's | 588 | 9209 |
| a | 9209 | 9239 |
| great | 9239 | 10196 |
| honor | 10196 | 11154 |
| ... | | |
| Chancellor | 22987 | 24135 |
| Kohl. | 24135 | 24703 |
| I've | 24703 | 25162 |
| been | 25162 | 25621 |
| looking | 25621 | 26419 |
| ... | | |
| technology | 38652 | 39260 |
| industry. | 39260 | 39839 |
| ... | | |

```
<!DOCTYPE linkweb SYSTEM "linkweb.dtd" [
  <!ENTITY sgmllink SYSTEM "lou.sgm" CDATA SGML>
]>
<linkweb>

<audio linkends="sgml54 audio54">
<urlloc id="audio54">file=d:\lou\lou_beta.mpg start=588 end=24703 unit=ms</urlloc>
<treeloc id="sgml54" locsrc=sgmllink>1 1 2 1 1</treeloc>

<audio linkends="sgml55 audio55">
<urlloc id="audio55">file=d:\lou\lou_beta.mpg start=24703 end=39839 unit=ms</urlloc>
<treeloc id="sgml55" locsrc=sgmllink>1 1 2 1 2</treeloc>
...
```

| LOCATOR | TEXT |
|---|---|
| 1 1 2 1 1 | It's a great honor for me to share this stage with the Lord Mayor and Chief Executive of Hannover, Mr. Jung; and in a few minutes, Chancellor Kohl. |
| 1 1 2 1 2 | I've been looking forward to this evening for a long time, because I've known for many years how important CeBIT is to the global information technology industry. |

| LOCATOR | SGML ID |
|---|---|
| 11211 | SGML54 |
| 11212 | SGML55 |
| ... | ... |

| SGML ID | AUDIO ID |
|---|---|
| SGML54 | AUDIO54 |
| SGML55 | AUDIO55 |
| ... | ... |

| AUDIO ID | Audio Locator |
|---|---|
| AUDIO54 | file=lou_beta.mpg start=588 end=24703 unit=ms |
| AUDIO55 | file=lou_beta.mpg start=24703 end=39839 unit=ms |
| ... | ... |

METHOD AND APPARATUS FOR LINKING REPRESENTATION AND REALIZATION DATA

RELATED APPLICATION

This application is a continuation of U.S. Ser. No. 09/447,871, filed Nov. 23, 1999, now U.S. Pat. No. 7,412,643 the entire contents of which are incorporated herein by reference.

FIELD OF THE INVENTION

The present invention is directed to the field of multimedia data handling. It is more particularly directed to linking multimedia representation and realization data.

BACKGROUND OF THE INVENTION

In recent years a new way of presenting information has been established. In this new multimedia approach, information is presented by combining several media, e.g. written text, audio and video. However, when using e.g. the audio data, finding and addressing specific structures (pages, chapters, etc. corresponding to the equivalent textual representation of the audio data) are either time consuming, complex, or impossible. A solution to overcome these problems is to link text and audio. The concept of linking text and audio is already used by some information providers. However, it is not widely used. One of the reasons for this is that it is a resource consuming process to build the hyper-links between the audio data and the corresponding textual representation. This either means a huge investment on the producers side, or a limited number of links, which limits the value for the user. As a result of the limiting state of the art user queries directed to databases containing multimedia material have to be in most cases quite general. For example a user asks "In which document do the words "Italian" and "inflation" occur?" A response to this query results in the complete audio document to be returned in which the requested data is enclosed.

SUMMARY OF THE INVENTION

Accordingly, it is an aspect of the present invention to provide an enhanced method and apparatus to link text and audio data. It recognizes that most acoustic multimedia data have a common property which distinguishes them from visual data. These data can be expressed in two equivalent forms: as a textual or symbolic representation, e.g. score, script or book, and as realizations, e.g. an audio stream. As used in an example of the present invention an audio stream is either an audio recording or the audio track of a video recording or similar data.

Information typically is presented as textual representation. The representation contains both the description of the content of the realization and the description of the structure of the realization. This information is used in the present invention to provide a method and apparatus for linking the representation and the realization.

Starting from a textual or symbolic representation, (e.g. a structured electronic text document,) and one or multiple realizations (e.g. digital audio files like audio recording which represent the corresponding recorded spoken words,) so called hyper links between the representation, (e.g. the text,) and the related realization, (e.g. the audio part,) are created. An embodiment is provided such that the realization is structured by combining a time-stamped (or otherwise marked) version of the representation generated from the realization with structural information from the representation. Errors within the time stamped representation are eliminated by aligning the time-stamped version of the representation generated from the realization with the content of the original representation in beforehand.

The hyper links are created by an apparatus according to the present invention. In one embodiment it is stored in a hyper document. These hyper links are used for performing search operations in audio data equivalent to those which are possible in representation data. This enables an improved access to the realization (e.g. via audio databases). Furthermore it is not only possible to search for elements of the input data, (e.g. words,) within the resulting hyper links or hyper document. But, it is also possible to navigate within the resulting data, (e.g. the hyper document,) and define the scope of the playback. In this context the word 'navigation' means things like 'go to next paragraph', 'show complete section that includes this paragraph', etc. In an embodiment, the scope of the playback is defined by clicking a display of a sentence, a paragraph, a chapter, etc. in a hyper link document. Thereby the segments of the realization, (e.g. the audio stream,) become immediately accessible. In accordance with the present invention, these capabilities are not created through a manual process. All or part of this information is extracted and put together automatically.

The time-alignment process of the present invention connects the realization domain with the representation domain and therefore allows that certain operations, which are generally difficult to perform in the realization domain, be shifted into the representation domain where the corresponding operation is relatively easy to perform. For example, in recorded speech, standard text-mining technologies can be used to locate sequences of interest. The structure information can be used to segment the audio signal in meaningful units like sentence, paragraph or chapter.

An aspect of the present invention enables the automatic creation of link and navigation information between text and related audio or video. This gives producers of multimedia applications a huge process improvement. On one hand, an advantage is that the software creates hyper links to the audio on a word by word, or sentence-by-sentence basis depending upon which is the more appropriate granularity for the application. Other embodiments use another basis that is appropriate for the problem to be solved. Therefore a major disadvantage of previous techniques, namely the limited number of links, is eliminated. On the other hand the technique of the present invention it dramatically reduces the amount of manual work necessary to synchronize a text transcript with its spoken audio representation, even if the result creates a higher value for the user. It also eliminates another disadvantage of the previous techniques, namely the high costs of building such linked multimedia documents.

Another aspect of the present invention is to generate a high level of detail, such that applications can be enhanced with new functions, or even new applications may be developed. Single or multiple words within a text can be aligned with the audio. Thus single or multiple words within a speech can be played, or one word in a sentence in a language learning application, or any sentence in a lesson, document, speech, etc. can be played.

BRIEF DESCRIPTION OF THE DRAWINGS

These and other aspects, features, and advantages of the present invention will become apparent upon further consideration of the following detailed description of the invention when read in conjunction with the drawing figures, in which.

DETAILED DESCRIPTION OF THE INVENTION

Figure 1:
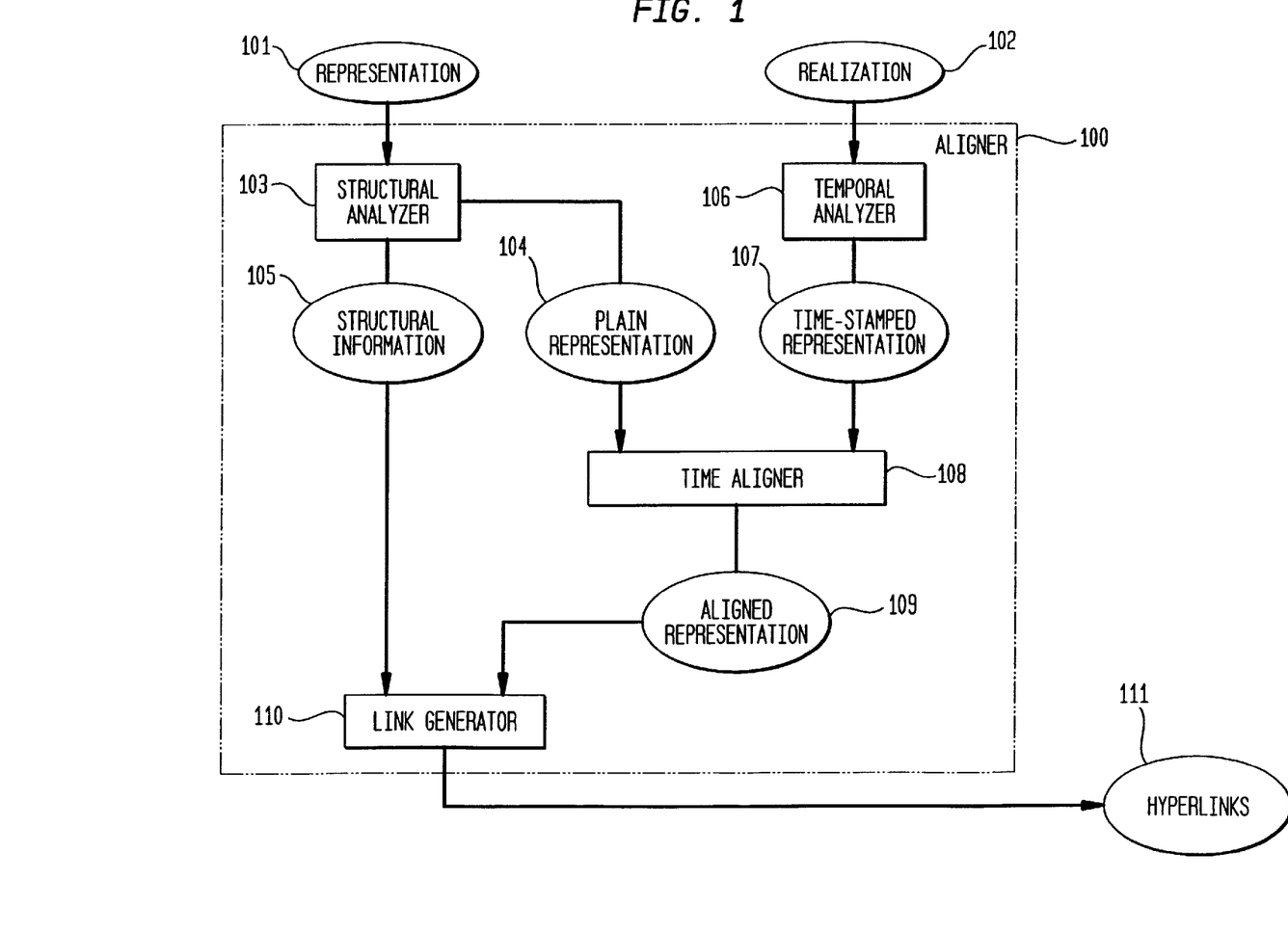
FIG. 1 shows an example of a schematic block diagram of the aligner in accordance with the present invention.

FIG. 1 shows an example embodiment of an aligner 100 according to the present invention. The aligner 100 comprises a structural analyzer 103 with input means. The structural analyzer 103 is connected via two output means to a time aligner 108 and a link generator 110. The aligner 100 further comprises a temporal analyzer 106 with input means. The temporal analyzer 106 is connected via output means to the time aligner 108. The time aligner 108 with two input means for receiving data from the structural analyzer 103 as well as from the temporal analyzer 106 is connected via output means to the link generator 110. The link generator 110 with two input means for receiving data from the structural analyzer 103 as well as from the time aligner 108 has an output means for sending data.

As shown in FIG. 1, the structuring process starts from a representation 101 and a realization 102. Usually both the representation 101 and the realization 102 are each stored in a separate file, but each of the data sets may actually be distributed among several files or be merged in one complex hyper-media file. In an alternate embodiment, both the representation 101 and the realization 102 may be fed into the system as a data stream.

Figure 2:
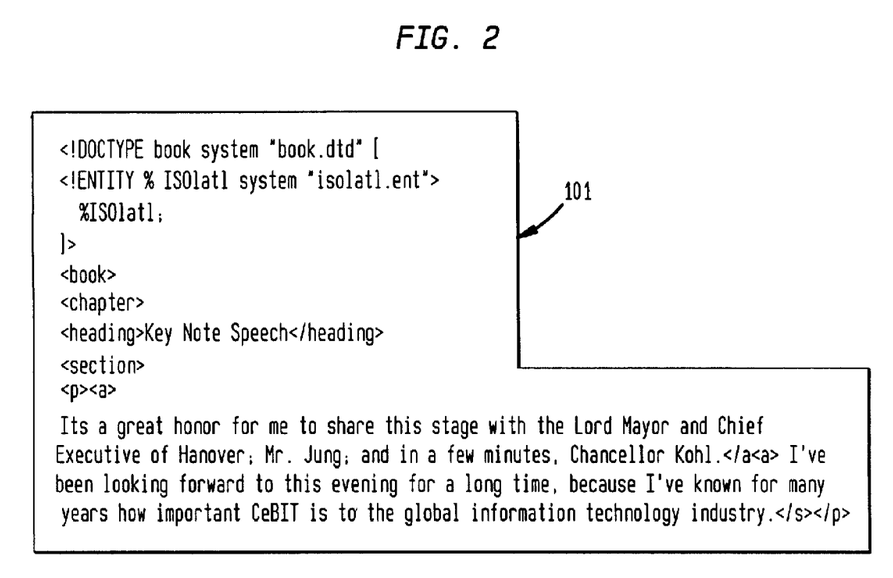
FIG. 2 shows an example of a textual representation of a book in SGML.

The representation 101 is a descriptive mark-up document, e.g. the textual representation of a book, or the score of a symphony. An example of a textual representation of a book marked up in Standard Generalized Markup Language (SGML) as defined in ISO 8879 is shown in FIG. 2. Thereby the SGML document comprises parts defining the structural elements of the book (characterized by the tag signs < ... >) and the plain content of the book. Instead of SGML other markup languages, e.g. Extensible Markup Language (XML) or LaTeX may be similarly used.

An example of a realization 102 is an audio stream in a arbitrary standard format, e.g. WAVE or MPEG. It may be for example a RIFF-WAVE file with the following characteristics: 22050/11025 Hz, 16 bit mono. In the example the realization 102 can be a narrated book in the form of a digital audio book.

Figure 3:
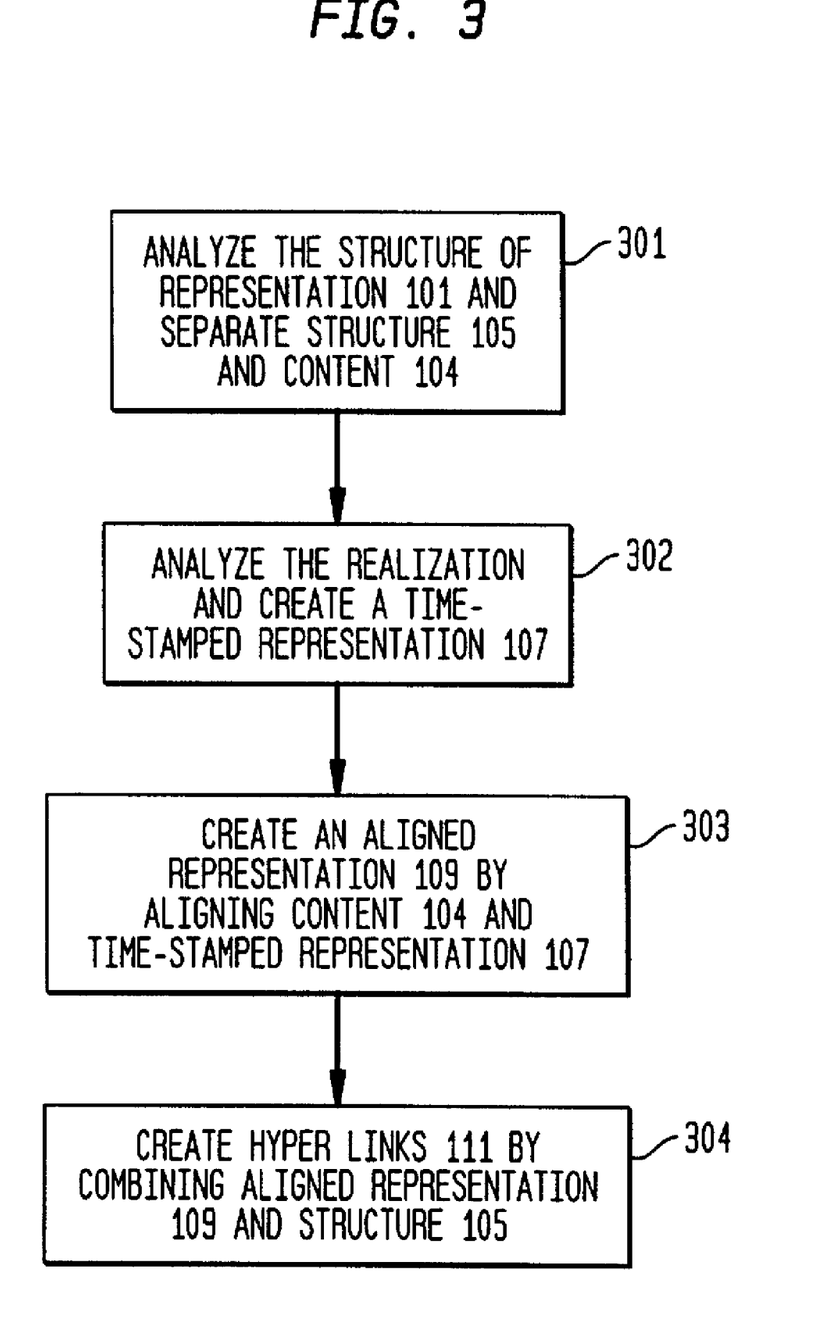
FIG. 3 shows an example of a flow chart diagram describing a method of combining representation and realization in accordance with the present invention.
Figure 4:
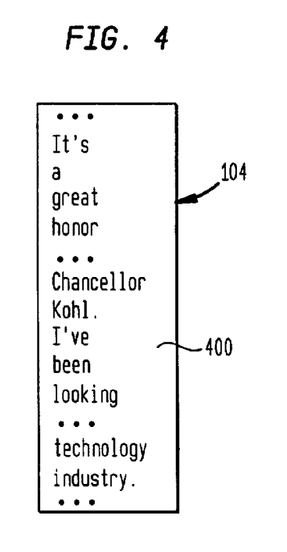
FIG. 4 shows an example of a plain representation as created by a structural analyzer.

An example of a procedure for combining representation 101 and realization 102 according to the present invention is illustrated in FIG. 3. In a first processing step 301, the representation 101 is fed into the structural analyzer 103. The structural analyzer 103 analyzes the representation 101 and separates the original plain representation 104 and a structural information 105. The plain representation 104 includes the plain content of the representation 101, that is the representation 101 stripped of all the mark-up. As an example the plain representation 104 (comprising the original words 400) of the representation 101 is shown in FIG. 4.

An example for a structural information 105 appropriate for audio-books is a text with locators. Therefore in the above embodiment the structural analyzer 103 builds a tree structure of the SGML tagged text 101 of the audio book and creates locators which determine the coordinates of the elements (e.g. words) within the structure of the representation 101. Those skilled in the art will not fail to appreciate that the imposed structure is not restricted to a hierarchical tree like a table of contents, but other structures, e.g. lattice or index may be used as well.

Figure 5:
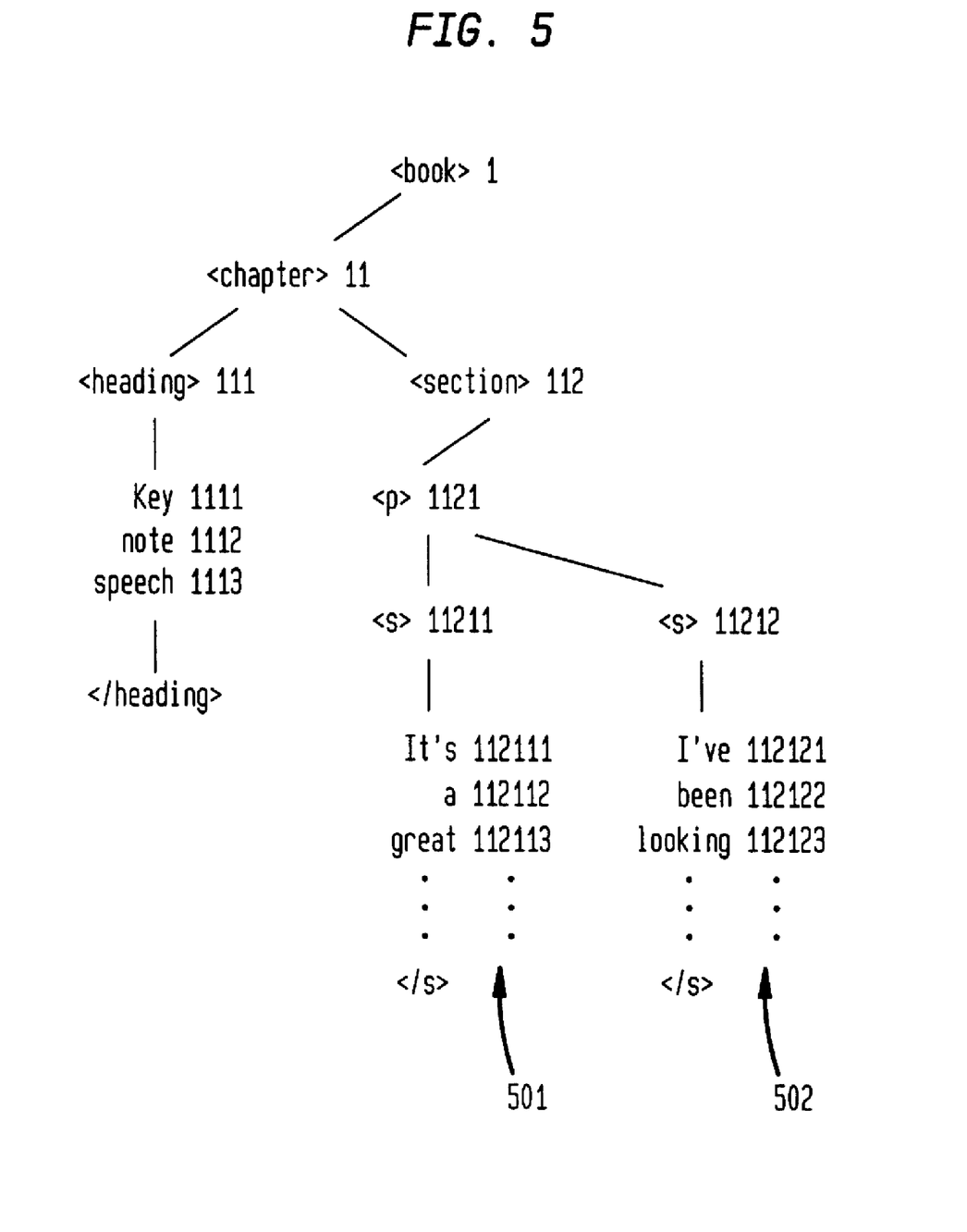
FIG. 5 shows an example of a tree structure of a representation with locators.

The process of document analysis and creation of structural information 105 as carried out in step 301 is now described. In FIG. 5 a tree structure with corresponding locators 501, 502, . . . , as built during this process is illustrated for the SGML formatted example depicted in FIG. 2.

After the representation 101 is obtained, the SGML file is fed into the structural analyzer 103, the structural analyzer 103 searches start elements (with the SGML tag structure < . . . >) and stop elements (with the SGML tag structure </ . . . >) of the representation 101. If the event is a start element a new locator is created. In the present embodiment, for the event <book> the locator "1", for the event <chapter> the locator "11" etc. is created. If the event is a data element, like <heading> or <s> (sentence), the content (words) together with the current locators are used to build the structural information 105 and the plain text is used to build the plain representation 104. In case the event is an end element, the structural analyzer 103 leaves the current locator and the procedure continues to examine the further events. If no further event exists the procedure ends.

Figure 6:
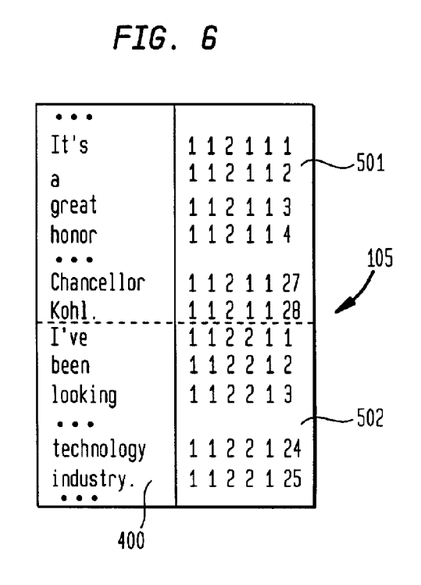
FIG. 6 shows an example of structural information as created by the structural analyzer.

An example embodiment of structural information 105 output by the structural analyzer 103 is shown in FIG. 6. The structural information 105 contains the elements of the realization 101 (corresponding to the plain representation 104), e.g. the words, in the first column, and the corresponding locators 501, 502, . . . in the second column.

In step 302 of FIG. 3, which may be carried out before, after or at the same time as step 301, the realization 102, e.g. the audio stream, is fed into the temporal analyzer 106. The temporal analyzer 106 generates a time-stamped (or otherwise marked) representation 107 from the realization 102. It is advantageous to generate a time-stamped representation 107 of the complete realization 102. However, some embodiments create marked or time-stamped representations 107 only of parts of the realization 102.

Figure 7:
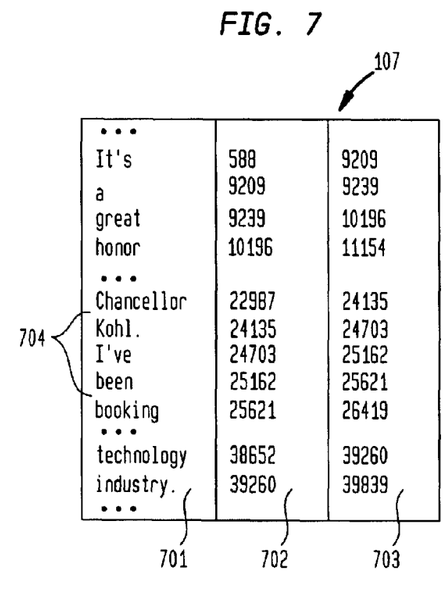
FIG. 7 shows an example of a time-stamped representation as created by the temporal analyzer.

The time-stamped representation 107 includes the transcript and time-stamps of all elementary representational units like e.g. word or word clusters. In the above example a speech recognition engine is used as temporal analyzer 106 to generate a raw time-tagged transcript 107 of the audio file 102. Many commercially available speech recognition engines might be used, for example IBM's ViaVoice. However, in addition to the recognition of words, the temporal/marker analyzer 106 should be able to allocate time stamps and/or marks for each word. An example for a such a time-stamped representation 107 is the transcript shown in FIG. 7. The start times 702 and the end times 703 in milliseconds are assigned to each word 701 of the resulting representation. The start and end times locators 702, 703 are time locators that specify an interval in the audio stream data using the coordinate system appropriate for the audio format, e.g. milliseconds for WAVE-files. The time-stamped representation 107 as shown in FIG. 7 may include words 704 which have not been recognized correctly, e.g. "Hohl" instead of "Kohl" or "booking" instead of "looking".

Figure 8:
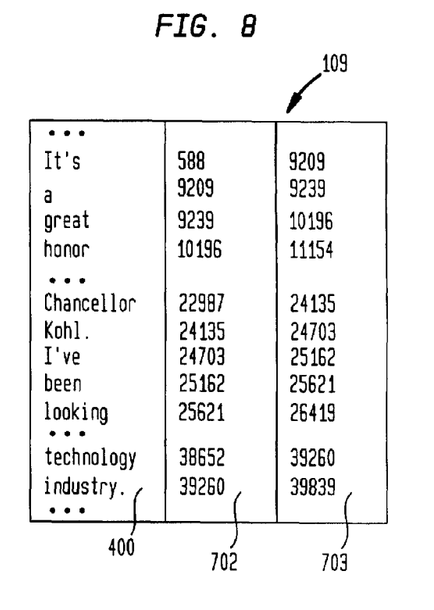
FIG. 8 shows an example of a time-stamped aligned representation as created by the time aligner.

In FIG. 3, step 303, the plain representation 104 derived from step 301 and the time-stamped representation 107 derived from step 302 are fed to the time aligner 108. The time aligner 108 aligns the plain representation 104 and the time-stamped representation 107. Thereby for the aligned elements, the time locator (start time 702, end time 703) from the time-stamped representation 107 is attached to the content elements (e.g. words) from the plain representation 104 leading to the time-stamped aligned representation 109. The time aligner 108 creates an optimal alignment of the words 701 from the time-stamped representation 107 and the words contained in the plain representation 104. This can be done by a variety of dynamic programming techniques. Such an alignment automatically corrects isolated errors 704 made by the temporal analyzer 106 by aligning the misrecognized words 704 with the correct counterparts, e.g. "Hohl" with "Kohl", "booking" with "looking". Missing parts of representation 101 and/or missing realization 102 result in that segments of the plain representation 104 and/or the time-stamped representation 107 remain unaligned. An example of an aligned representation 109 combining the correct words 400 and the time locators 702, 703 is shown in FIG. 8.

In step 304 of FIG. 3, the structural information 105 and the time-stamped aligned representation 109, e.g. in form of data streams, are fed into a link generator 110. The link generator 110 then combines the locators 501, 502, . . . of each element from the structural information 105 with the respective time locator 702, 703 from the time-stamped aligned representation 109, thereby creating connections between equivalent elements of representation 101 and realization 102, so called time-alignment hyper links 111. In an embodiment these hyper links 111 are stored in a hyperlink document. In an alternative embodiment these hyperlinks are transferred to a data base.

It is advantageous that the hyper-link document be a HyTime document conforming to the ISO/IEC 10744: 1992 standard, or a type of document using another convention to express hyperlinks, e.g. DAISY, XLink, SMIL, etc.

Figure 9:
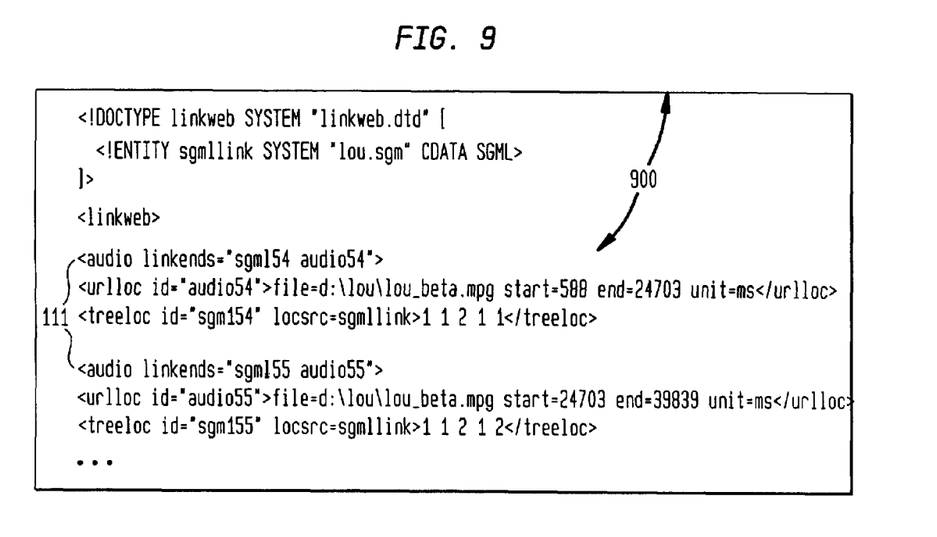
FIG. 9 shows an example of a hyper-link document with hyper links as created by the link generator.

Whereas in the above example the locators of each word are combined, it is however possible to combine the locators of sentences or paragraphs or pages with the corresponding time locators. An example for a hyper-link document 900 in HyTime format is shown in FIG. 9. Therein for each sentence the locators 501, 502, . . . , for the representation 101 and the time locator 702, 703, . . . , for the realization 102 are combined in hyper links. An alternate embodiment creates hyper links 111 wherein the locators for each word or for each other element (paragraph, page, etc.) are combined.

It will be understood and appreciated by those skilled in the art that the inventive concepts described by the present application may be embodied in a variety of system contexts. Some of the typical application domains are described in the following.

Sometimes either the representation or the realization (or both) is not available in a native or operating data format directly processable by the aligner 100. In this case the available data has to be converted from a native format into the data format which can be used by the aligner 100 directly.

Thus, in some cases, the native alien format of the original representation is not the same format as the native alien format of the realization. The representation is given in a native data format (A). The realization is given in a native data format (B). These data formats are different. In an embodiment, the representation (A) is converted into an operating data format (A') and the realization (B) is converted into an operating data format (B').

Figure 10:
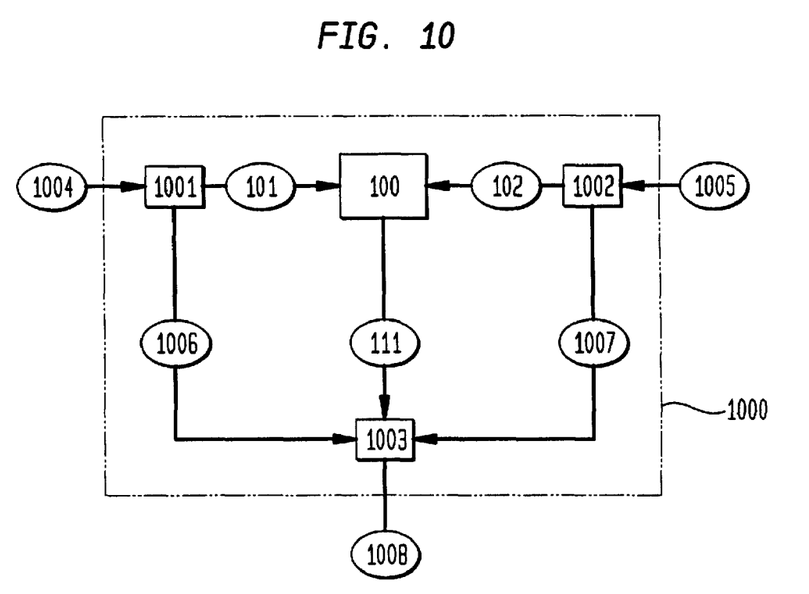
FIG. 10 shows an example of a aligner for other file formats in accordance with the present invention.

FIG. 10 illustrates an example of an aligner 1000 for other file formats in accordance with the present invention. Using the aligner 1000 it becomes possible to create hyper links or hyper-link documents defined in the native format of the representation and/or realization. For example for the representation a large variety of such native representational formats exist. These range from proprietary text formats like e.g., Microsoft Word or Lotus WordPro, to text structuring languages like e.g. Troff or TeX.

This aligner 1000 includes aligner 100 shown in FIG. 1. Additionally a first converter 1001, and/or a second converter 1002, and a link transformer 1003 are elements of the aligner 1000. These elements are connected to each other as shown in FIG. 10.

In an embodiment the following procedure is applied. First the native representation 1004 is converted by the first converter 1001 into a representation 101 in an operating or standard format, e.g. SGML. Additionally the first converter 1001 produces information necessary to re-convert the resulting hyper links 111 into the native format. Such information can be e.g. a representation mapping table 1006 (a markup mapping table).

The native realization 1005 is converted by a second converter 1002 into a realization 102 in the operating or standard format, e.g. WAVE. In addition a realization mapping table 1007 (a time mapping table) is created by the second converter 1002.

In the described example it is assumed, that both the representation and the realization have to be converted before being processed by the aligner 100. A situation is however possible, in which only the representation 101 or only or the realization 102 has to be converted. Accordingly the procedure has to be adapted to the particular situation.

Both converters 1001, 1002 are programmed according to the source and destination formats. The detailed implementation of the converters 1001, 1002 and the way of creating the mapping tables 1006, 1007 are accomplished in ways known to those skilled in the art. Next both the representation and the realization, each in operating/standard format, are fed into the aligner 100. Aligner 100 creates the hyper-links 111 as described above. Next, the hyper-links 111 or the corresponding hyper-link document 900 and the mapping tables 1006, 1007 are used by the link transformer 1003 to create native hyper-links 1008 in the format of the original representation 1004. For this purpose the link transformer 1003 uses the mapping tables 1006 and/or 1007 to replace the locators in the hyper links 111 with locators using the appropriate coordinate systems for the native representation 1004 and/or native realization 1005 as specified by the mapping tables 1006, 1007. For example if the native representation 1004 was written in HTML format, it would than be converted into SGML format by the first converter 1001. The hyper links 111 created by the aligner 100 would than be retransformed into HTML by the link transformer 1003 using the mapping table 1006.

Sometimes either the representation 101 and/or the realization 102 is enhanced by using information from the other. Examples include automatic subtitling, time-stamping the dialogues in a script, etc.

Figure 11:
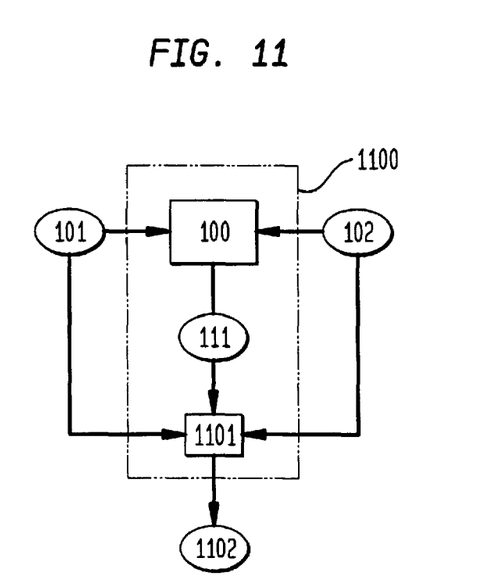
FIG. 11 shows an example of an aligner with enhancer in accordance with the present invention.

FIG. 11 illustrates an example of an aligner 1100 with an enhancer corresponding to the present invention. The enhancer 1101 is employed to create enhanced versions of representation 101 and/or realization 102. The enhancer 1101 uses the hyper links 111 or the hyper-link document 900 from the aligner 100 and the original representation 101 and/or the original realization 102 to create an enhanced representation and/or an enhanced realization 1102 or both. Thereby the enhancer 1101 includes the hyper links 111 into the original representation 101 or realization 102. A typical example for an enhanced representation 1102 is the addition of audio clips to an HTML file. Other examples are the addition of a synchronized representation to MIDI or RIFF files. It is noted that the aligner 1100 with enhancer can of course be combined with the principle of the aligner 1000 for other file formats as described above.

Telecast applications (TV, digital audio broadcasting etc.) use an interleaved system stream that carries the representation 101, the realization 102 and a synchronization information. The synchronized information is created in the form of a system stream by an aligner with a multiplexer in accordance with the present invention. Again FIG. 11 may be used to illustrate the system. This aligner with multiplexer may be implemented to use the aligner 100 as described above. A multiplexer (corresponding to the enhancer 1101 in FIG. 11) is employed to generates an interleaved system stream (corresponding to the enhanced representation 1102 in FIG. 11). In this way, the multiplexer combines the original representation 101, the original realization 102 and the hyper links 111 into one combined system stream. It is noted that the concept of the aligner with multiplexer can be combined with the principles of using other file formats and with the principles of creating an enhanced representation and/or realization as described above.

An example embodiment, applying the present invention to an audio database system is now described. Realization 102, representation 101, and hyper links 111 according to the present invention can be used to create an audio database that allows a user to access only the relevant segments of recorded speech data. For this purpose, the representation 101, the realization 102, and hyper links 111 are transferred into a database to use typical database access methods to search and navigate through the information. Any database may be used, e.g. relational databases etc. The import module of such a database reads the hyper links 111, (which are for example included in a hyper link document 900,) the representation 101, and the realization 102. The module generally stores these information in an internal table representation.

It is advantageous to use such a database to implement applications which enable an user to exploit the hyper links 111. Accordingly, an example embodiment employs the concept of a structured audio database using a query by audio content engine. From the viewpoint of the user the database is an audio database. The user queries the database in order to get audio data according to his query. For example the user may query such a database by entering keywords or phrases into a graphical user interface (GUI) query mask. If a voice-type interface is used, the user queries the database using audio queries. These audio queries are then converted into text queries, e.g. by means of voice recognition.

In cases wherein the user would ordinarily get a complete document in which the requested audio data is enclosed as the result of his query, using the data base concept of the present invention the user indicates the structural unit of the results expected (e.g. word, sentence, paragraph, any etc.) before the query is sent to the database. This is done for example by selecting a corresponding button or an item from a drop-down list in a GUI. In an alternate embodiment using a speech user interface (SUI), the user speaks his query to the computer using either a controlled or a free vocabulary. An example would be: "Find me all paragraphs where "Italian" and "inflation" occur in the same sentence."

In the following example embodiment the requested structural unit is "sentence". After the text query is directed to the audio database, the internal table representation is used to search for certain words and phrases and locate the respective piece of audio.

Figure 12:
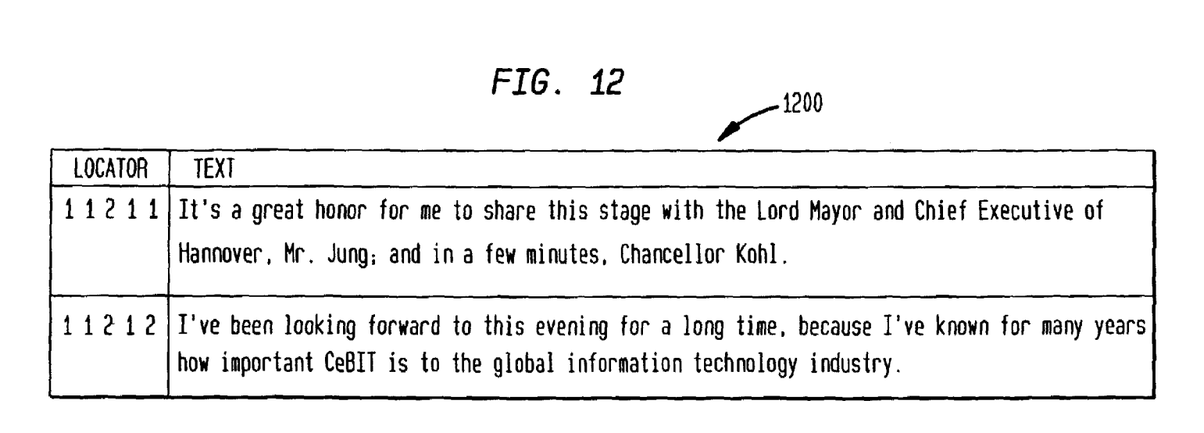
FIG. 12 shows an example of a first mapping table as used in an audio database in accordance with the present invention.
Figure 13:
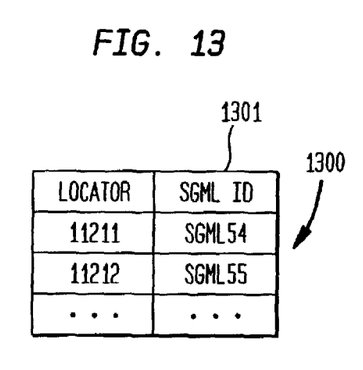
FIG. 13 shows an example of a second mapping table as used in an audio database in accordance with the present invention.
Figure 14:
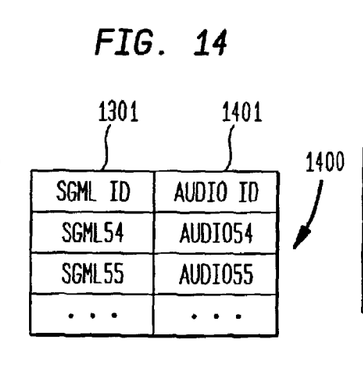
FIG. 14 shows an example of a third mapping table as used in an audio database in accordance with the present invention.
Figure 15:
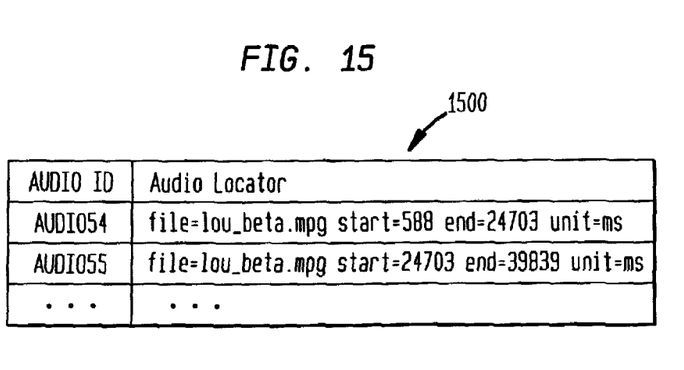
FIG. 15 shows an example of a fourth mapping table as used in an audio database in accordance with the present invention.

FIG. 12 shows an embodiment of an example of a first mapping table 1200 with locators 501, 502 and text. The query is applied to this first mapping table 1200 and a text search is performed. In the embodiment the search method uses a simple substring query or a more advanced techniques as for example linguistic text mining. In the example the search data is contained in the second column of mapping table 1200. Assuming the search word is contained in the sentence in the second row. According to mapping table 1200 the locator related to this sentence is "11212". Than, using this locator, the corresponding locator identifier (ID) ID 1301 (here "SGML55") is determined using a second mapping table 1300 as shown in FIG. 13. Next, using this locator ID 1301, the corresponding time locator ID (audio ID) 1401 (here "AUDIO55") is determined using a third mapping table 1400 as shown in FIG. 14. Finally, using the time locator ID 1401, the corresponding time locator (which is the audio locator in milliseconds) for this sentence is determined using a fourth mapping table 1500. The audio information (filename, start time 702, end time 703) resulting from the query is found and retrieved from mapping table 1500. The corresponding audio data is output to the user subsequently.

If the requested piece was not a sentence, but for example the paragraph containing this sentence, then additional information from the internal table representation, e.g. from a table representing the structure of the corresponding document tree, is used to determine the locator of the first and the last sentence of the requested paragraph. The above steps are performed for each locator and the resulting audio locators are combined into a new one.

Depending on the type of structural unit selected, in a GUI the search results are presented to the user as a resulting document comprising a list or a tree of hits. For example the tree starts with a list of all the documents in the database that contain at least one hit. At each structural level this list can be navigated by expanding the nodes until the smallest structural unit that contains a hit is reached. At each stage the segment of the audio data containing the hit can be played by clicking on the corresponding node of the result tree.

In the case of a SUI, the search results are summarized and read to the user by a speech synthesizer. As for example:
"In the database are four audio documents that contain the phrase you have searched. These are grouped in decreasing order of hit frequency: document number two with three hundred hits, document three with one hundred hits, document number one with twenty hits, and document number four with two hits."

As in querying the database, the user can respond with speech input and ask the system to either expand a node for further details or to play a node.

Since, not only the content but also the structural information of the input data are used in the present invention it is possible to search not only though the content, but through the structure of the input data. This means that it is possible to search for a question and a corresponding answer in an interview or vice versa.

Because of the presence of hyper links and/or hyper link documents in the audio data base as described above, it is advantageous that the database be implemented as a web enabled database. Accordingly in an embodiment, the user interface is a web browser, e.g. an HTML interface for search panels and displaying matching item lists. The presentation of the text and all search results is done as HTML or XML documents. The complex hyper link structure created is transferred to the simple hyperlink structure, e.g. HTML, of common web browser. Any sentence in the resulting document is hyper-linked with the related audio section. The parts that match the search criteria are highlighted. Navigation through the text (next sentence, previous paragraph, etc.) is done by clicking small icons attached to the document structure. Starting playback of the related audio section is done by clicking an icon or the text itself.

Potential applications for this technology include hybrid electronic text/audio books e.g. on CD-ROM, etc. where the production process can be enhanced at the same time by providing more functions for the end user. In Internet and Intranet magazines, original interviews and speeches can be added to the text. In broadcast archives, specific passages from a set of longer speeches can be extracted more effectively. The search and access of specific words or phrases in all kind of audio archives is supported. This simplifies access for the public and/or scientists. In court recording easy access to any statement is possible. This is not only in writing, but also in direct access to the spoken words. In general, the present invention provides a platform for multimedia applications, e.g. language learning applications. The invention makes it possible: to combine the written text and spoken text (audio) in a way that allows to easily switch between them; take the text to extract the information; search through it; and if there is an interesting part, just click on it and listen to the related spoken words (or even view the scene on video). Furthermore the present invention supports a variety of different languages (e.g. English, German, Italian, Spanish, Japanese, Chinese, Arabic, etc.).

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

It is noted that the foregoing has outlined some of the more pertinent objects and embodiments of the present invention. The concepts of this invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art. Thus, it should be understood that the embodiments has been provided as an example and not as a limitation. The scope of the invention is defined by the appended claims.

We claim:

1. An apparatus for linking an original representation including text and a realization of the representation in non-text form, comprising:
   a processor;
   a structural analyzer for automatically separating a plain representation and structural information pertaining to structure of the contents of said text from the original representation;
   a temporal analyzer for automatically generating a time-stamped first representation from the realization;
   a time aligner for creating a time-stamped aligned representation by aligning the plain representation and the time-stamped first representation;
   a link generator for creating hyper links between elements of the original representation and the realization by combining the aligned representation and the structural information;
   a first converter for converting the original representation from any native data format to an operating data format for representations, and a second converter for converting the realization from any native data format to an operating data format for realizations, wherein the first converter is connected to the structural analyzer, and the second converter is connected to the temporal analyzer,
   wherein the hyper links can be used for performing search operations in audio data,
   wherein the original representation is a descriptive markup document and the realization is an audio stream, and wherein the audio stream includes an audio recording and/or the audio track of a video recording.

2. The apparatus as recited in claim 1, wherein the structural analyzer is for including the content of the original representation into the plain representation and for including structural locators which determine coordinates of elements within a structure of the original representation into the structural information.

3. The apparatus as recited in claim 1, wherein the temporal analyzer is for including time locators into the time-stamped first representation, whereby the time locators specify an interval in the realization using an appropriate coordinate system.

4. The apparatus as recited in claim 1, wherein the time aligner is for aligning content of the original representation with time locators from the time-stamped first representation.

5. The apparatus as recited in claim 1, wherein the link generator is for creating the hyper links by combining time locators from the time-stamped first representation and structural locators from the structural information.

6. The apparatus as recited in claim 1, wherein the link generator is for creating the hyper links between words and/or sentences and/or paragraphs and/or pages of the original representation and the realization.

7. The apparatus as recited in claim 1, wherein the link generator is for storing the hyper links in a hyperlink document.

8. The apparatus as recited in claim 1, wherein the link generator is for transferring the hyper links in a database.

9. The apparatus as recited in claim 1 wherein the structural analyzer and the temporal analyzer include input means for receiving the original representation and/or the realization as a data stream.

10. The apparatus as recited in claim 1, wherein the first and/or second converter are for generating information necessary to re-convert the hyper links into the native data format, and the apparatus further comprises:
a link transformer connected to an output of the apparatus, wherein the link transformer is for transforming the resulting hyper links into hyper links in the native data format of the original representation and/or realization by using the re-converting information generated by the converter.

11. The apparatus as recited in claim 10, wherein the first and/or second converter is for creating the re-converting information in a form of a representation mapping table and a realization mapping table respectively.

12. The apparatus as recited in claim 1, further comprising an enhancer connected to the output of an apparatus, wherein the enhancer is for including the hyper links into the original representation and/or the realization to create enhanced versions of the representation and/or the realization.

13. The apparatus as recited in claim 1, further comprising a multiplexer connected to an output of the apparatus, wherein the multiplexer is for combining the hyper links with the original representation and the realization to create a combined system stream.

14. An article of manufacture comprising a non-transitory computer readable storage medium having computer readable program code means embodied therein for causing a linking of an original representation containing text and a realization of said original representation, the computer readable program code means in said article of manufacture comprising computer readable program code means for causing a computer to effect:
automatically separating, by structural analyzer, a plain representation and structural information pertaining to structure of the contents of said text from the original representation;
automatically generating, by a temporal analyzer, a time-stamped first representation from the realization;
creating, by a time aligner, a time-stamped aligned representation by aligning the plain representation and said time-stamped first representation;
creating, by a link generator, hyper links between elements of the original representation and realization by combining the aligned representation and the structural information; and
converting, by a first converter, the original representation from any native data format to an operating data format for representations, and converting, by a second converter, the realization from any native data format to an operating data format for realizations, wherein the first converter is connected to the structural analyzer, and the second converter is connected to the temporal analyzer,
wherein the hyper links can be used for performing search operations in audio data,
wherein the original representation is a descriptive markup document and the realization is an audio stream, and
wherein the audio stream includes an audio recording and/or the audio track of a video recording.

15. A method for linking an original representation including text and a realization of the original representation in non-text form, comprising the steps of:
separating automatically, by structural analyzer, in a computer system a plain representation and structural information pertaining to structure of the contents of said text from the original representation;
generating automatically, by a temporal analyzer, in a computer system a time-stamped first representation from the realization;
creating, by a time aligner, a time-stamped aligned representation by aligning the plain representation and the time-stamped first representation;
creating, by a link generator, hyper links between elements of the original representation and realization by combining the aligned representation and the structural information; and
converting, by a first converter, the original representation from any native data format to an operating data format for representations, and converting, by a second converter, the realization from any native data format to an operating data format for realizations, wherein the first converter is connected to the structural analyzer, and the second converter is connected to the temporal analyzer,
wherein the hyper links can be used for performing search operations in audio data,
wherein the original representation is a descriptive markup document and the realization is an audio stream, and
wherein the audio stream includes an audio recording and/or the audio track of a video recording.

* * * * *